(12) United States Patent
Hoffmeier

(10) Patent No.: US 6,688,542 B1
(45) Date of Patent: Feb. 10, 2004

(54) PRESSURE JOINT FOR A PUMP

(75) Inventor: Dieter Hoffmeier, Ibbenbüren (DE)

(73) Assignee: Oase Wubker GmbH & Co. KG, Horstel (DE)

( * ) Notice: Subject to any disclaimer, the term of this patent is extended or adjusted under 35 U.S.C. 154(b) by 0 days.

(21) Appl. No.: 10/070,132

(22) PCT Filed: Aug. 31, 2000

(86) PCT No.: PCT/DE00/02963

§ 371 (c)(1),
(2), (4) Date: Mar. 4, 2002

(87) PCT Pub. No.: WO01/18441

PCT Pub. Date: Mar. 15, 2001

(30) Foreign Application Priority Data

Sep. 3, 1999 (DE) ............................ 199 42 189

(51) Int. Cl.⁷ ................................ B05B 15/08
(52) U.S. Cl. ................ 239/587.3; 239/587.1; 239/587.4
(58) Field of Search .................. 239/587.1–587.5, 239/597

(56) References Cited

U.S. PATENT DOCUMENTS

| | | | | |
|---|---|---|---|---|
| 2,342,757 A | * | 2/1944 | Roser | 239/587.3 |
| 2,581,047 A | | 1/1952 | Salmond et al. | |
| 2,619,388 A | * | 11/1952 | Wahlin | 239/597 |
| 4,925,097 A | * | 5/1990 | Corrigan | 239/581.1 |
| 6,305,620 B1 | * | 10/2001 | Marchese | 239/587.2 |

OTHER PUBLICATIONS

Siemens Pump: Portable Mobile Stationary Brochure, Jan. 28, 1963, Siemens–Schuckertwerke Aktiengesellschaft, Berlin–Erlangen.

* cited by examiner

Primary Examiner—Dinh Q. Nguyen

(57) ABSTRACT

The invention relates to a pressure joint (1) for pumps with a pump connection (3.8) and a first discharge connection (5.5) comprising a second discharge connection which can be throttled to produce a jet which is connected to the first discharge connection (5.5) on a first joint element (3.2) and which has a pump connection (3.8) which can be moved at an angle relative to a second joint element (3.1).

3 Claims, 1 Drawing Sheet

PRESSURE JOINT FOR A PUMP

FIELD OF THE INVENTION

The present invention relates to a pressure joint for a pump, and more particularly to a fitting assembly for a pump's pressure outlet.

BACKGROUND OF THE INVENTION

One type of pressure joint is known from U.S. Pat. No. 5,617,999 and provides a fitting for a pump connector and an output for connection to a hose or pipe, through which the pumped fluid, e.g. pond water, can flow to a filter. Such a pressure joint is regularly used in order to transport for example, pond water, through a filter.

FR 902 066 discloses a fitting assembly including a first and second joints that may be angularly adjusted relative to each other. One outlet fitting is formed in one of the joints.

A disadvantage of these known pressure joints is that different joints must be used for interconnection to a filter or a fountain or jet.

It is therefore an object of the present invention to provide a pressure joint that may function as connectors for both filters and fountains.

SUMMARY OF THE INVENTION

According to one aspect of the present invention, there is provided a fitting assembly for a pump's pressure outlet, with a pump connector and a first output fitting, and a second output fitting, with a swivel joint between the pump connector and the first and second output fitting. The swivel joint has a first linking element and a second linking element wherein the second output fitting and the first output fitting are part of the first linking element, and the pump connector is part of the second linking element. The swivel joint has a plane of rotation of 360°, and the first output fitting and the pump connector have lengthwise extending axes subtending an angle of smaller than 90° with the plane of rotation of swivel joint.

As a result of the present invention it is possible to use one and the same pressure joint in two different applications, even at the same time, as a portion of pumped pond water is used in a fountain or jet while the rest is pumped through a filter.

BRIEF DESCRIPTION OF THE DRAWINGS

An embodiment of the invention is more particularly described with reference to the drawings.

DETAILED DESCRIPTION

Figure 1:
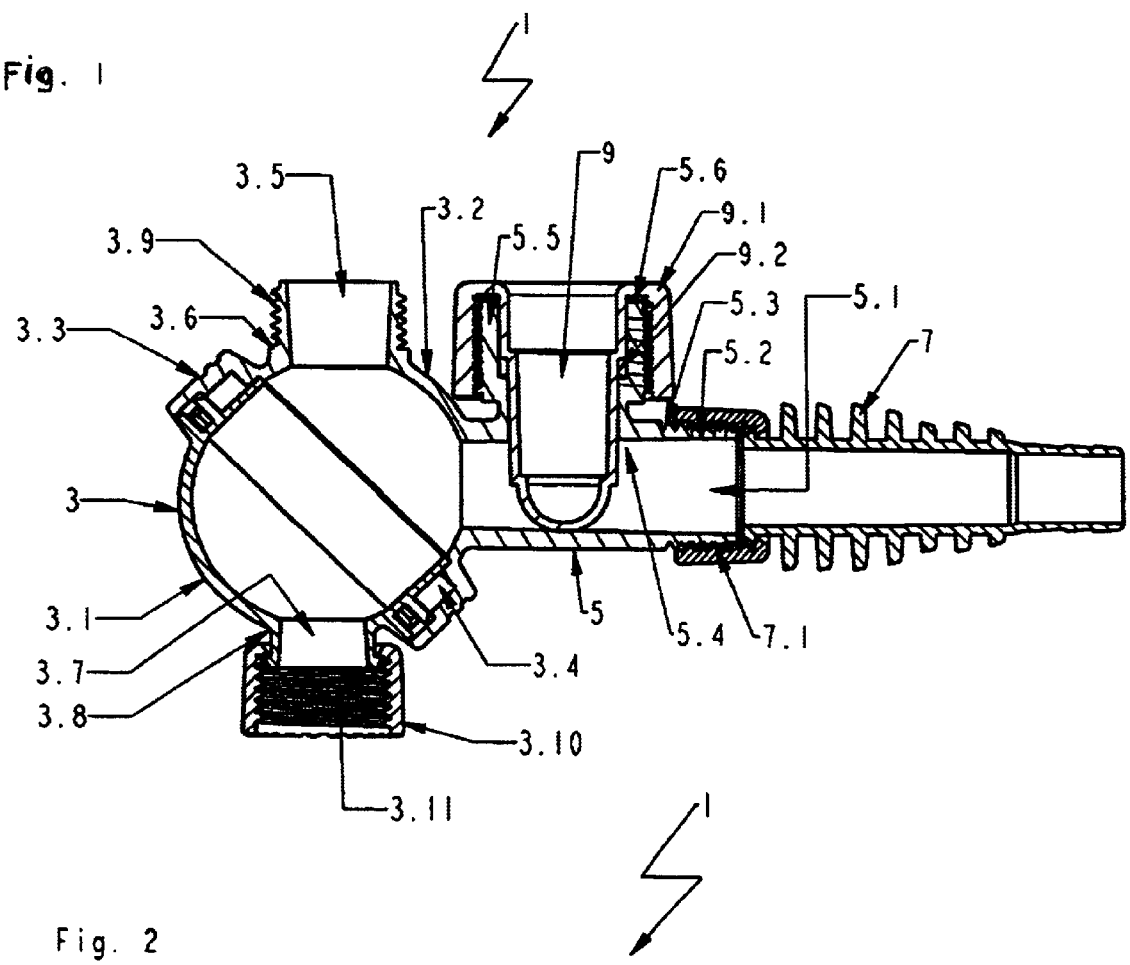
FIG. 1 a schematic cross-section of an exemplary pressure joint in an operating state for pumping.

FIG. 1 illustrates a pressure joint 1 exemplary of invention 1 in cross-section. Pressure joint 1 includes a swivel joint 3 and a joining portion 5.

Swivel joint 3 includes a first linking element 3.1 formed as a lower half shell and a second linking element 3.2 formed as an upper half shell, which are connected for relative rotation in a plane by 360 by connecting area 3.3. Connecting area 3.3 includes a space 3.4 that provides for a seal, (e.g. washer). If a seal is used, pressure joint 1 may also be used for a dry arrangement.

Such swiveling connections are general well known and are therefore not further described.

Upper half shell 3.2 of the swivel joint 3 includes first opening 3.5 having a first fitting 3.6 providing a first output, e.g. to a filter. Lower half shell 3.1 includes a second opening 3.7 with a second fitting 3.8 for connection with a pump (not shown).

The lengthwise extending axes of fittings 3.6 and 3.8 subtend an angle smaller than 90 with the plane of rotation of swivel joint 3, and preferably subtend an angle of approximately 45. The axes are thus arranged symmetrically about an axis normal to the plane of rotation. In the example embodiment the longitudinal axes of the connecting pieces 3.6 and 3.8 lie in a common vertical plane.

Fittings 3.6 and 3.8 preferably include an outer thread 3.9, so that a complementary cap 3.10 or a similar component having a complementary inner thread 3.11 can be screwed on. In addition, all other well-known screw and plug fitting systems may be used as fittings 3.6 and 3.8.

Joining portion 5 extends from upper half shell 3.2 of the swivel joint 3 (i.e. on the same half shell 3.2 as fitting 3.6) and includes an opening 5.1 with a fitting 5.2 for a second output, for example to a fountain spout. In the example embodiment, fitting 5.2 includes an outer thread 5.3, so that for example, a hose connector 7 with a female fitting 7.1 can be interconnected.

Joining portion 5 includes a further opening 5.4 having a fitting 5.5. The longitudinal axis of fitting 5.5 is preferably in the same vertical plane as the longitudinal axis of fitting 3.6 of upper half shell 3.

Fitting 5.5 includes an outer thread 5.6. A throttle organ 9 with an outer surface complementary to the an inner surface of fitting 5.5 and with a fitting 9.1 having an inner thread complementary to outer thread 5.6 may be screwed into connecting portion 5 through fitting 5.5 and opening 5.4. Thus a flow path in the joining portion 5 can be restricted or enlarged. This affects the pressure in the pumping water, and according affects discharge characteristics characteristic (forming a jet, or fountain). A seal 9.2 between throttle organ 9 and the fitting 5.5 ensures a tight connection.

In operation, the joining portion 5 be oriented in a vertical orientation or in a horizontal orientation or any intermediate orientation using swivel joint 3. In the vertical, orientation fitting 3.6 can be capped with a cap 3.10 to provoke a jet solely by way of throttle organ 9. Alternatively fitting 3.6 may remain open so that a partial flow may be used to produce a jet, and the remainder may be pumped to a filter.

Figure 2:
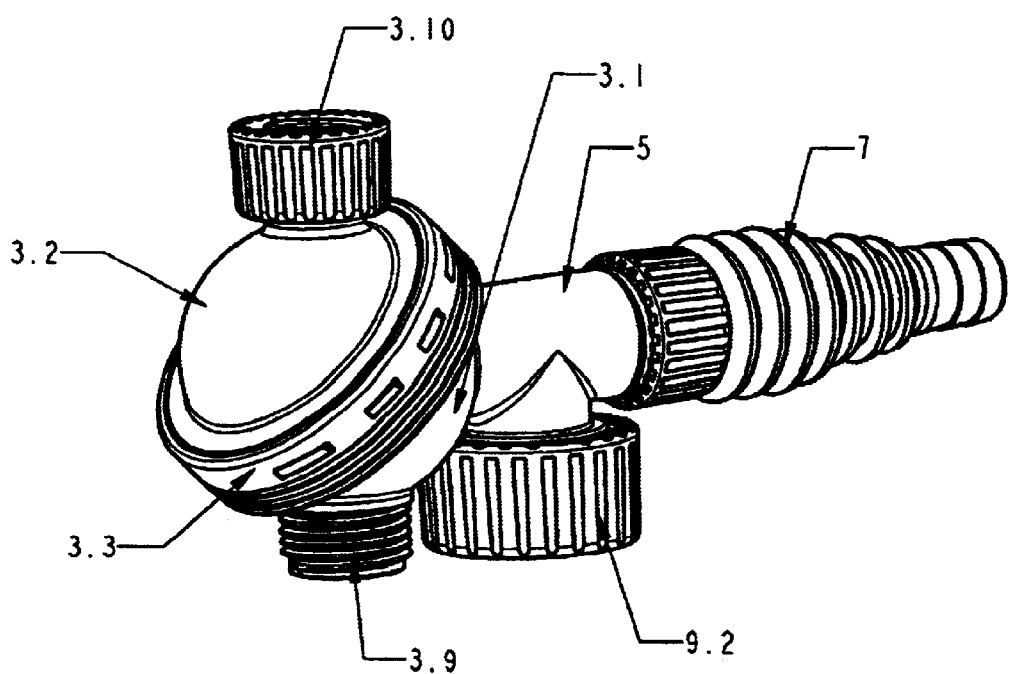
FIG. 2 a upside down view of the pressure joint of FIG. 1, in perspective.

Now, if pond water is to be pumped exclusively to a filter, or to be simply to be pumped out of the pond, joining portion 5 may be re-oriented to the orientation of FIG. 1 or FIG. 2, and throttle organ 9 may be completely closed. Cap 3.10 may be removed from the fitting 3.6 and a hose, pipe or the like may be screwed on.

What is claimed is:

1. Fitting assembly for a pump's pressure outlet, with a pump connector and a first output fitting, and a second output fitting, and with a swivel joint between said pump connector and said first and second output fitting, said swivel joint having a first linking element and a second linking element wherein said second output fitting and said first output fitting are part of said first linking element, and said pump connector is part of said second linking element, and said swivel joint has a plane of rotation of 360°, and wherein said first output fitting and said pump connector have lengthwise extending axes subtending an angle of smaller than 90° with the plane of rotation of swivel joint.

2. Fitting assembly according to claim 1, wherein said second output may be pivoted on said first linking element between a horizontal and a vertical orientation, when said pump connector is vertically positioned.

3. Fitting assembly according to claim 1, wherein said second output fitting comprises a throttle organ to adjust a fluid flow through said second output fitting.

* * * * *